(12) United States Patent
Gundert et al.

(10) Patent No.: US 8,592,537 B2
(45) Date of Patent: Nov. 26, 2013

(54) CATALYST SYSTEM FOR THE POLYMERIZATION OF OLEFINS

(75) Inventors: Friedhelm Gundert, Liederbach (DE); Martin Schneider, Hochheim (DE); Giampiero Morini, Padua (IT)

(73) Assignee: Basell Poliolefine Italia S.r.l., Milan (IT)

( * ) Notice: Subject to any disclaimer, the term of this patent is extended or adjusted under 35 U.S.C. 154(b) by 57 days.

(21) Appl. No.: 12/995,952

(22) PCT Filed: Jun. 8, 2009

(86) PCT No.: PCT/EP2009/056999
§ 371 (c)(1),
(2), (4) Date: Dec. 2, 2010

(87) PCT Pub. No.: WO2009/150114
PCT Pub. Date: Dec. 17, 2009

(65) Prior Publication Data
US 2011/0077367 A1    Mar. 31, 2011

Related U.S. Application Data

(60) Provisional application No. 61/132,344, filed on Jun. 18, 2008.

(30) Foreign Application Priority Data

Jun. 13, 2008   (EP) .................................. 08158231

(51) Int. Cl.
*C08F 4/50*   (2006.01)
(52) U.S. Cl.
USPC ...................................................... 526/124.3

(58) Field of Classification Search
USPC ........................................................ 526/124.3
See application file for complete search history.

(56) References Cited

U.S. PATENT DOCUMENTS

| 4,613,581 | A | * | 9/1986 | Maruyama et al. ........... 502/127 |
| 5,863,995 | A |   | 1/1999 | Daire |
| 5,990,251 | A |   | 11/1999 | Gelus |
| 2003/0027952 | A1 |   | 2/2003 | Farrer et al. |

FOREIGN PATENT DOCUMENTS

| EP | 0115691 A | 8/1984 |
| EP | 0703246 A | 3/1996 |
| KR | 2007059621 | 12/2007 |
| WO | WO 03/010212 A | 2/2003 |

OTHER PUBLICATIONS

PCT International Search Report and the Written Opinion—Mailed Dec. 17, 2009 for Corresponding PCT/EP2009/056999.

* cited by examiner

*Primary Examiner* — Yong Chu
*Assistant Examiner* — Sonya Wright

(57) ABSTRACT

A catalyst system for the polymerization of olefins comprising (A) a catalyst component obtained by reacting a $Mg(OR_1)(OR_2)$ compound, in which $R_1$ and $R_2$ are identical or different and are each an alkyl radical having 1 to 10 carbon atoms, with a tetravalent transition metal compound having at least a Metal-halogen bond, used in amounts such that the molar ratio Met-al/Mg is from 0.05 to 10; (B) an aluminum alkyl compound and (C) a linear or branched halogenated alkyl compound.

15 Claims, No Drawings

CATALYST SYSTEM FOR THE POLYMERIZATION OF OLEFINS

This application is the U.S. national stage under 35 U.S.C. §371 of Int. Appl. No. PCT/EP2009/056999, filed 8 Jun. 2009, and claims priority to Eur. Appl. No. 08158231.4 filed 13 Jun. 2008 and provisional U.S. application Ser. No. 61/132,344 filed 18 Jun. 2008; the disclosures of Int. application No. PCT/EP2009/056999, Eur. Appl. No. 08158231.4 and U.S. Appl. No. 61/132,344, each as filed, are incorporated herein by reference.

The present invention relates to a catalyst for the polymerization of olefins, in particular ethylene and its mixtures with olefins $CH_2$=CHR, wherein R is an alkyl, cycloalkyl or aryl radical having 1-12 carbon atoms, comprising a solid catalyst component comprising Ti, Mg, halogen, obtained by a specific procedure and an aluminum alkyl compound and certain specific halogenated alkyl compounds.

The polymerization activity is a very important factor in any polymerization process. For a given catalyst system, it may depends on the polymerization conditions, such as temperature, pressure and molecular weight regulator concentration. However, once fixed the polymerization conditions, the activity depends strictly on the catalyst system and when the activity is not satisfactory the amount of catalyst fed to the reactor must be increased or its residence time made longer. In any case it is clear that the above solution penalizes the plant operability for the economic point of view as the increase of catalyst fed means increase of the cost per unity of polymer produced, while the increase of the residence time means a lower productivity of the plant.

In view of this importance, the need of increase the catalyst activity is always felt. The Ziegler-Natta catalyst are generally obtained by reacting an aluminum alkyl compound with a solid catalyst component comprising a magnesium halide and a titanium compound containing at least a Ti-halogen bond. As the catalyst component is responsible for both the activity and the polymer properties, once the catalyst system has been chosen for industrial production it is changed for a different one having higher activity, only if the new one maintains basically unaltered the polymer properties. This is the reason why it is needed to modify the catalyst activity of a certain catalyst system without changing its capability to produce a polymer with certain properties.

Particularly, in the ethylene polymerization processes, where the catalyst system usually does not comprise external donor compounds for increasing the stereospecificity, the attempt for increasing the activity, usually relates to the use of halogenated hydrocarbon compounds as activity enhancer. Such a use is disclosed for example in U.S. Pat. No. 5,863,995, and EP 703246 A1. The Korean patent application KR2007-059621 relates process for the polymerization of olefins by the use of an activity improved catalyst system comprising a magnesium supported catalyst, an aluminum alkyl compound and a cyclic aromatic or aliphatic halogenated compound. The said document describes useful advantages by the combination of cyclic halogenated compounds with solid catalyst components obtained by reacting $MgCl_2$, alcohol and a titanium compound. It does not mention or suggest the use of different halogenated compounds in combination with catalyst components prepared by different chemical routes.

Accordingly, the present invention relates to a catalyst system for the polymerization of olefins comprising (A) a catalyst component obtained by reacting a $Mg(OR_1)(OR_2)$ compound, in which $R_1$ and $R_2$ are identical or different and are each an alkyl radical having 1 to 10 carbon atoms, with a tetravalent transition metal compound having at least a Metal-halogen bond, used in amounts such that the molar ratio Metal/Mg is from 0.05 to 10; (B) an aluminum alkyl compound and (C) a linear or branched halogenated alkyl compound.

Preferably, the compound (C) has from 1 to 10 carbon atoms, more preferably from 1 to 8 carbon atoms and especially from 2 to 6 carbon atoms. The halogen is preferably chlorine and it constitutes a preferred embodiment the use of compounds (C) having one or two halogen atoms. Preferably the halogen atom is linked a secondary carbon atom.

Non limiting exemplary compounds (C) are Ethylchloride Propylchloride, i-propylchloride, butylchloride, s-butylchloride, t-butylchloride, pentyl chloride, i-pentyl chloride, i-propyl bromide 1,2-dichloroethane, 1,6-dichlorohexane, 1-Bromopropane, and 2-bromopropane, propylbromide, butylbromide, s-butylbromide, t-butylbromide, i-butylbromide i-pentylbromide, t-pentylbromide. Among them, particularly preferred are ethyl chloride 2-chlorobutane, 1-chlorohexane and t-Bu-Cl.

The aluminum alkyl can be preferably selected from the trialkyl aluminum compounds such as for example trimethylaluminum (TMA), triethylaluminum (TEAL), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, ethyl aluminium dichloride (EADC) Al-sesquichloride and dimethylaluminum chloride (DMAC) can be used. It is also possible to use, and in certain cases preferred, mixtures of trialkylaluminum's with alkylaluminum halides such as TEAL/DEAC, TEA/EADC, TIBA/DEAC. It is also possible to use, and in certain cases preferred, the reaction product of a trialkylaluminum or dialkylaluminum hydride with isoprene known as isoprenylaluminum. When mixtures of aluminum alkyls are used the total molar amount of Al is used to determine the ratio (B)/(C).

In the preparation of the catalyst component (A), $R_1$ and $R_2$ are preferably alkyl groups having from 2 to 10 carbon atoms or a radical —$(CH_2)_nOR_3$, where $R_3$ is a $C_1$-$C_4$-alkyl radical and n is an integer from 2 to 6. Preferably $R_1$ and $R_2$ are $C_1$-$C_2$-alkyl radical. Examples of such magnesium alkoxides are: magnesium dimethoxide, magnesium diethoxide, magnesium di-i-propoxide, magnesium di-n-propoxide, magnesium di-n-butoxide, magnesium methoxide ethoxide, magnesium ethoxide n-propoxide, magnesium di(2-methyl-1-pentoxide), magnesium di(2-methyl-1-hexoxide), magnesium di(2-methyl-1-heptoxide), magnesium di(2-ethyl-1-pentoxide), magnesium di(2-ethyl-1-hexoxide), magnesium di(2-ethyl-1-heptoxide), magnesium di(2-propyl-1-heptoxide), magnesium di(2-methoxy-1-ethoxide), magnesium di(3-methoxy-1-propoxide), magnesium di(4-methoxy-1-butoxide), magnesium di(6-methoxy-1-hexoxide), magnesium di(2-ethoxy-1-ethoxide), magnesium di(3-ethoxy-1-propoxide), magnesium di(4-ethoxy-1-butoxide), magnesium di(6-ethoxy-1-hexoxide), magnesium dipentoxide, magnesium dihexoxide. Preference is given to using the simple magnesium alkoxides such as magnesium diethoxide, magnesium di-n-propoxide and magnesium di-1-butoxide. The magnesium alkoxide is used as a suspension or as a gel dispersion. The magnesium alcoholate is employed in the pure form.

In general, commercially available $Mg(OC_2H_5)_2$ has average particle diameter ranging from 200 to 1200 μm preferably about 500 μm.

Preferably before the reaction with the transition metal halide the magnesium alcoholate is suspended in an inert, saturated hydrocarbon. In order to lowering the magnesium alcoholate particle size, the suspension can be subject to high shear stress conditions by means of a high-speed disperser (for example Ultra-Turrax or Dispax, IKA-Maschinenbau Janke & Kunkel GmbH) working under inert atmosphere (Ar or $N_2$). Preferably the shear stress is applied until a gel-like dispersion is obtained. This dispersion differs from a standard suspension in that it is substantially more viscous than the suspension and is gel-like. Compared with the suspended magnesium alcoholate, the dispersed magnesium alcoholate settles out much more slowly and to a far lesser extent. The magnesium alkoxide is firstly reacted with the tetravalent transition metal compound of the formula (II)

$$MX_m(OR_4)_{4-m} \qquad (II),$$

where M is titanium, zirconium or hafnium, preferably titanium or zirconium, $R_4$ is an alkyl radical having from 1 to 9, preferably from 1 to 4 carbon atoms and X is a halogen atom, preferably chlorine, and m is from 1 to 4, preferably from 2 to 4.

Examples which may be mentioned are: $TiCl_4$, $TiCl_3(OC_2H_5)$, $TiCl_2(OC_2H_5)_2$, $TiCl(OC_2H_5)_3$, $TiCl_3(OC_3H_7)$, $TiCl_2(OC_3H_7)_2$, $TiCl(OC_3H_7)_3$, $TiCl_3OC_4H_9$, $TiCl_2(OC_4H_9)_2$, $TiCl(OC_4H_9)_3$, $TiCl_3(OC_6H_{13})$, $TiCl_2(OC_6H_{13})_2$, $TiCl(OC_6H_{13})_3$, $ZrCl_4$, preference is given to using $TiCl_4$ or $ZrCl_4$. Particular preference is given to $TiCl_4$.

The reaction of the magnesium alkoxide with the tetravalent transition metal compounds is carried out at a temperature at from 20 to 140° C., preferably from 60 to 90° C., over a period of from 1 to 20 hours. Suitable inert suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

The magnesium alkoxide and the tetravalent transition metal compound can be reacted in a molar ratio of Metal/Mg ranging from 0.05 to 10, preferably from 0.2 to 4. The reaction is carried out in suspension, under stirring at a temperature ranging from 60 to 200° C., preferably from 70 to 140° C., or from 0.1 to 10 hours, preferably from 0.5 to 7 hours. After the reaction, hydrocarbon washings can be carried out until the supernatant mother liquor has Cl and Ti (Zr/Hf) concentrations of less than 10 mmol/l.

Either before or after the washing, the reaction mixture containing the product of the reaction between the magnesium alcoholate and the transition metal compound can be subject to a thermal treatment at a temperature ranging from 80° C. to 160° C. preferably from 100° C. to 140° C. for a period of time ranging from 0.1 to 100 hours preferably from 0.5 to 70 hours. At the end of the preparation process the a particle size of the catalyst component (A) preferably ranges from 5 to 30 μm.

As catalyst component B, use is made of a trialkylaluminum having from 1 to 6 carbon atoms in the alkyl radical, e.g. triethylaluminum, triisobutylaluminum, triisohexylaluminum, Preference is given to triethylaluminum and triisobutylaluminum.

The mixing of the component A and the component B can be carried out in a stirred vessel at a temperature of from −30° C. to 150° C. prior to the polymerization. It is also possible to combine the two components directly in the polymerization vessel at a polymerization temperature of from 20° C. to 200° C. However, it is preferred to carry out the addition of the component B in two steps by pre-activating the component A with part of the component B at a temperature of from −30° C. to 150° C. prior to the polymerization reaction and adding the remainder of the component B in the polymerization reactor at a temperature from 20° C. to 200° C.

The preactivation is usually carried out using an aliquot of component (B) such that the Al/Ti molar ratio is less than 2 and preferably less than 1. Preferably, the initial contact temperature ranges from 0° C. to 60° C. while a further stage at a temperature ranging from 80° C.-140° C. is preferably added. The whole pre-activation step can preferably last from 0.5 to 5 hours.

It is also possible firstly to prepolymerize the preactivated catalyst system with alpha-olefins, preferably linear C2-C10-1-alkenes and in particular ethylene or propylene, and then to use the resulting prepolymerized catalyst solid in the actual polymerization. The mass ratio of catalyst solid used in the prepolymerization to monomer polymerized onto it is usually in the range from 1:0.1 to 1:20.

It is also possible to isolate the catalyst in the non-prepolymerized form or in the prepolymerized form and store it as a solid and re-suspend it on later use.

The contact with the component (C) can be carried out according to any procedure, that is the three components can be reacted simultaneously before or during polymerization or the component (C) can be first reacted with component (A) or (B) and then reacting the resulting product with the remaining component (A) or (B).

In a preferred way of operation, the component (C) is pre-contacted with both component (A) and (B) immediately before or during the polymerization. In this embodiment, the contact is carried out at a temperature ranging from −0° C. to 150° C., preferably from 20° C. to 100° C. The component (C) is used in amount such as to give a (C)/M molar ratio ranging from 0.1 to 5 preferably from 0.2 to 4.

According to another preferred embodiment, the component (C) is first reacted with component (A) and the so obtained reaction product is then contacted with the total or partial amount of component (B).

The reaction of (C) with the component (A) can take place during or at the end of the preparation of (A). Preferably, the contact takes place at the end of the preparation of (A). The component (C) is used in amount such as to give a general (C)/M molar ratio ranging from 0.1 to 15. In order to obtain an increased polymerization activity, the specific amount of component (C) used in respect of the transition metal compound depends on the prospected time elapsing the contact (A)/(C) and the use in polymerization together with component (B). If this time will be short, i.e., within the terms of hours the compound (C) can be used in amount such as to give a (C)/M molar ratio ranging from 0.1 to 5 preferably from 0.2 to 4. If the time will be longer, i.e., in terms of days a higher amount of compound shall be used such as to have a (C)/M molar ratio ranging from 4 to 15 and preferably from 5 to 12.

The catalysts systems of the invention are particularly suited for liquid phase polymerization process. In fact, the small average particle size of the component (A), such as less than 30 μm, preferably ranging from 5 to 20 μm, is particularly suited for slurry polymerization in an inert medium, which can be carried out continuously stirred tank reactor or in loop reactors. In a preferred embodiment the polymerization process is carried out in two or more cascade loop or stirred tank reactors producing polymers with different molecular weight and/or different composition in each reactor. In addition, to the ethylene homo and copolymers mentioned above the catalysts of the present invention are also suitable for preparing very-low-density and ultra-low-density polyethylenes (VLDPE and ULDPE, having a density lower than 0.920 $g/cm^3$, to 0.880 $g/cm^3$) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.

EXAMPLES

The results for the elemental composition of the catalysts described in the examples were obtained by the following analytical methods:

Ti: photometrically via the peroxide complex
Mg, Cl: titrimetrically by standard techniques

Example 1 a) Preparation of the Catalyst Component A

A suspension of 4.5 kg (=39 mol) of commercial available $Mg(OC_2H_5)_2$ in 20 $dm^3$ of diesel oil having a boiling range from 140 to 170° C. (hydrogenated petroleum fraction) have been treated in a high speed disperser (Krupp Supraton™ type S200) at 60° C. for a period of 16 hours thus forming a gel-like dispersion. This $Mg(OC_2H_5)_2$-dispersion was transferred to a 130 $dm^3$ reactor equipped with an impeller stirrer and baffles and which already contained 29 $dm^3$ of dieseloil. After rinsing with 5 $dm^3$ of dieseloil 18.7 kg (=98 mol) of $TiCl_4$ were then added at 85° C. over a period of 5 hours at a stirring speed of 100 rpm. After an after-reaction time of 0.5 hour, the mixture was heated at T=120° C. for 1 hour. 40 $dm^3$ of diesel oil having a boiling range from 140 to 170° C. (hydrogenated petroleum fraction) were then added and the mixture was cooled to T=75° C. After the solid had settled, the supernatant liquid phase (mother liquor) was then decanted off to a residual volume of 50 $dm^3$. 55 $dm^3$ of fresh diesel oil (hydrogenated petroleum fraction having a boiling range from 140 to 170° C.) were subsequently introduced. After a stirring time of 20 minutes and a sedimentation period of ca. 45 minutes the supernatant liquid was again decanted off to a residual volume of 50 $dm^3$. This washing procedure was repeated until the titanium concentration of the mother liquor was less than 10 $mmol/dm^3$. The suspension was then cooled to room temperature. The titanium concentration was 47 $mmol/dm^3$ and the molar ratio of the solid (=catalyst component A) was:

Mg:Ti:Cl≈1:0.11:2.23.

b) Ethylene Polymerization in Suspension

The polymerization experiments were carried out batchwise in a 200 $dm^3$ reactor. This reactor was equipped with an impeller stirrer and baffles. The temperature in the reactor was measured and automatically kept constant. The polymerization temperature was 85±1° C.

The polymerization reaction was carried out in the following way:

100 $dm^3$ of diesel oil (hydrogenated petroleum fraction having a boiling range from 140 to 170° C.) were placed in the $N_2$-blanketed reactor and heated to 85° C. Under a blanket of inert gas ($N_2$), 50 mmol of triethylaluminum diluted to 200 $cm^3$ with dieseloil were added as cocatalyst (catalyst component B). To an amount of the catalyst component A prepared as described under a) corresponding to 2.0 mmol of titanium 0.065 g (=0.70 mmol) of n-butylchloride was added as component C. After dilution with diesel oil to 200 $cm^3$ this mixture of component A and C was introduced into the reactor. The molar ratio of component B/Ti and component C/Ti was thus 25:1 and 0.35, respectively.

The reactor was pressurized a number of times with $H_2$ (hydrogen) to 8 bar and depressurized again to remove the nitrogen completely from the reactor (the procedure was monitored by measurement of the $H_2$ concentration in the gas space of the reactor, which finally indicated 95% by volume). The polymerization was started by opening the ethylene inlet. Ethylene was introduced in an amount of 8.0 kg/h over the entire polymerization time, with the pressure in the reactor rising slowly. The concentration of hydrogen in the gas space of the reactor was measured continually and the proportion by volume was kept constant by introducing appropriate amounts of hydrogen (% by volume of $H_2$ about. 55).

The polymerization was stopped after 225 minutes (total of 30 kg of ethylene gas fed in). For quantification of catalyst productivity the specific mileage is determined as follows:

Specific mileage=kg polyethylene/(g catalyst*$bar_{ethylene}$*polymerization-time in hours). The results of the polymerizations are shown in Table 1.

Example 2

Example 2 was performed in the same way as described in example 1 with the exception that 0.216 g (=2.34 mmol) of n-butylchloride was added as component C.

In the polymerization the molar ratio of component B/Ti and component C/Ti was 25:1 and 1.17, respectively. The results of the polymerizations are listed in Table 1.

Example 3

Example 3 was performed in the same way as described in example 1) with the exception that 0.065 g (=0.54 mmol) of n-hexylchloride was added as component C.

In the polymerization the molar ratio of component B/Ti and component C/Ti was 25:1 and 0.27, respectively. The results of the polymerizations are listed in Table 1.

Comparative Example 1

Example 3 was performed in the same way as described in example 1) with the exception that no component C was added. In the polymerization the molar ratio of component B/Ti was 25:1. The results of the polymerizations are listed in Table 1.

Example 4 a) Preparation of the Catalyst Component A

In a 130 $dm^3$ reactor equipped with an impeller stirrer and baffles 4.5 kg (=39 mol) of commercial available $Mg(OC_2H_5)_2$ were suspended in 59 $dm^3$ of diesel oil having a boiling range from 140 to 170° C. (hydrogenated petroleum fraction). Then 18.7 kg (98 mol) of $TiCl_4$ were added at 85° C. over a period of 5 hours at a stirring speed of 120 rpm. After an after-reaction time of 0.5 hour, the mixture was heated at T=120° C. for 1 hour. 40 $dm^3$ of diesel oil having a boiling range from 140 to 170° C. (hydrogenated petroleum fraction) were then added and the mixture was cooled to T=75° C. After the solid had settled, the supernatant liquid phase (mother liquor) was then decanted off to a residual volume of 50 $dm^3$. 55 $dm^3$ of fresh diesel oil (hydrogenated petroleum fraction having a boiling range from 140 to 170° C.) were subsequently introduced. After a stirring time of 20 minutes and a sedimentation period of ca. 45 minutes the supernatant liquid was again decanted off to a residual volume of 50 dm$^3$. This washing procedure was repeated until the titanium concentration of the mother liquor was less than 10 mmol/dm$^3$.

The suspension was then cooled to room temperature. The titanium concentration was 53 mmol/dm$^3$ and the molar ratio of the solid (catalyst component A) was:

Mg:Ti:Cl≈1:0.105:2.18.

b) Ethylene Polymerization in Suspension

The ethylene polymerization of catalyst component A was performed as described in example 1) with the exception that 0.063 g (=0.68 mmol) of sec.-butylchloride was added as component C. In the polymerization the molar ratio of component B/Ti and component C/Ti was 25:1 and 0.34, respectively. The results of the polymerizations are listed in Table 1.

Example 5

Example 5 was performed in the same way as described in example 4 with the exception that 0.063 g (=0.68 mmol) of tert.-butylchloride was added as component C.

In the polymerization the molar ratio of component B/Ti and component C/Ti was 25:1 and 0.34, respectively. The results of the polymerizations are listed in Table 1.

Comparative Example 2

Comparative example 2 was performed in the same way as described in example 4 with the exception that no component C was added. In the polymerization the molar ratio of component B/Ti was 25:1. The results of the polymerizations are listed in Table 1.

Example 6 a) Preactivation of Catalyst Component A

Preactivation of catalyst component A as described in example 1a was carried out with triethylaluminium (TEA). The molar Al/Ti-ratio was 0.85:1. The reaction was performed at 60° C. for a time-period of 2 hours.

b) Ethylene Polymerization in Suspension

The ethylene polymerization of preactivated catalyst component A was performed as described in example 1) with n-butylchloride as component C.

In the polymerization the molar ratio of component B/Ti and component C/Ti was 25:1 and 0.34, respectively. The results of the polymerizations are listed in Table 1.

Example 7

Example 7 was performed in the same way as described in example 6) with the exception that 0.053 g (0.57 mmol) of sec.-butylchloride was added as component C. In the polymerization the molar ratio of component B/Ti and component C/Ti was 25:1 and 0.29, respectively. The results of the polymerizations are listed in Table 1.

Example 8

Example 8 was performed in the same way as described in example 6 with the exception that 0.132 g (1.43 mmol) of sec.-butylchloride was added as component C.

In the polymerization the molar ratio of component B/Ti and component C/Ti was 25:1 and 0.71, respectively. The results of the polymerizations are listed in Table 1.

Example 9

Example 9 was performed in the same way as described in example 6 with the exception that 0.198 g (2.14 mmol) of sec.-butylchloride was added as component C. In the polymerization the molar ratio of component B/Ti and component C/Ti was 25:1 and 1.07, respectively. The results of the polymerizations are listed in Table 1.

Example 10

Example 10 was performed in the same way as described in example 6 with the exception that 0.396 g (4.28 mmol) of sec.-butylchloride was added as component C. In the polymerization the molar ratio of component B/Ti and component C/Ti was 25:1 and 2.14, respectively. The results of the polymerizations are listed in Table 1.

Example 11

Example 11 was performed in the same way as described in example 6 with the exception that 0.396 g (4.28 mmol) of tert.-butylchloride was added as component C. In the polymerization the molar ratio of component B/Ti and component C/Ti was 25:1 and 2.14, respectively. The results of the polymerizations are listed in Table 1.

Comparative Example 3

Comparative example 3 was performed in the same way as described in example 6 with the exception that no component C was added. In the polymerization the molar ratio of component B/Ti was 25:1. The results of the polymerizations are listed in Table 1.

Example 12 a) Preparation of the Preactivated Catalyst Component A

In a 130 dm$^3$ reactor equipped with an impeller stirrer and baffles 4.5 kg (39 mol) of commercial available Mg(OC$_2$H$_5$)$_2$ are suspended in 59 dm$^3$ of diesel oil having a boiling range from 140 to 170° C. (hydrogenated petroleum fraction). Then 18.7 kg (98 mol) of TiCl$_4$ were added at 85° C. over a period of 5 hours at a stirring speed of 80 rpm. After an after-reaction time of 0.5 hour, the mixture was heated at T=120° C. for 1 hour. 40 dm$^3$ of diesel oil having a boiling range from 140 to 170° C. (hydrogenated petroleum fraction) were then added and the mixture was cooled to T=75° C. After the solid had settled, the supernatant liquid phase (mother liquor) was then decanted off to a residual volume of 50 dm$^3$. 55 dm$^3$ of fresh diesel oil (hydrogenated petroleum fraction having a boiling range from 140 to 170° C.) were subsequently introduced. After a stirring time of 20 minutes and a sedimentation period of ca. 45 minutes the supernatant liquid was again decanted off to a residual volume of 50 dm$^3$. This washing procedure was repeated until the titanium concentration of the mother liquor was less than 10 mmol/dm$^3$. The suspension was then cooled to room temperature. The molar ratio of the solid (catalyst component A) was:

Mg:Ti:Cl≈1:0.086:2.26.

The suspension was diluted with dieseloil to a titanium concentration of 25 mmol/dm$^3$ and subsequently 53 dm$^3$ of this catalyst component A suspension was preactivated with 1126 mmol of TEA (2.0 dm$^3$ of 10 wt-% solution in hexane) at 60° C. for a time-period of 2 hours. The molar Al/Ti-ratio was thus 0.85:1. By decantation of 33 dm$^3$ of diesel oil the preactivated suspension of catalyst component A was concentrated to a titanium concentration of 48 mmol/dm$^3$.

After sampling of 1 dm$^3$ for the comparative experiment 139 g (=1.5 mol) of sec.-butylchloride were added as component C leading to a molar ratio of component C/Ti 1.4. Then again a sample of 1 dm³ was taken. After a maturity time of 4 days the polymerization of this sample was performed as described in example 1) but without further addition of a component C.

The results of the polymerizations are listed in Table 2.

Example 13

To the mixture of catalyst suspension of component A and component C described in example 12 additional 260 g (2.8 mol) of sec.-butylchloride were added as component C leading to an overall molar ratio of component C/Ti=4.4. Then again a sample of 1 dm³ was taken. After a maturity time of 4 days the polymerization of this sample was performed as described in example 1) but without further addition of a component C. The results of the polymerizations are listed in Table 2.

Example 14

To the mixture of catalyst suspension of component A and component C described in example 13 additional 121 g (1.3 mol) of sec.-butylchloride were added as component C leading to an overall molar ratio of component C/Ti=5.5. Then again a sample of 1 dm³ was taken. After a maturity time of 5 and 12 days, respectively the polymerizations were performed as described in example 1) but without further addition of a component C. The results of the polymerizations are listed in Table 2.

Example 15

To the mixture of catalyst suspension of component A and component C described in example 14 additional 115 g (=1.2 mol) of sec.-butylchloride were added as component C leading to an overall molar ratio of component C/Ti=7.7. Then again a sample of 1 dm³ was taken. After a maturity time of 6 and 28 days, respectively the polymerizations were performed as described in example 1) but without further addition of a component C. The results of the polymerizations are listed in Table 2.

Example 16

To the mixture of catalyst suspension of component A and component C described in example 15 additional 109 g (=1.1 mol) of sec.-butylchloride were added as component C leading to an overall molar ratio of component C/Ti=9.7. Then again a sample of 1 dm³ was taken. After a maturity time of 6 and 28 days, respectively the polymerizations were performed as described in example 1) but without further addition of a component C. The results of the polymerizations are listed in Table 2.

Comparative example 4

Polymerization of comparative sample as described in example 12 is carried out as described in example 1 without addition of component C. The results of the polymerizations are listed in Table 2.

TABLE 1

| Example | Comp. C | mass-C [g] | mol C [mmol] | Ratio C/Ti [mol/mol] | Specific Mileage [kgPE/(gcat * barC2 * h)] |
|---|---|---|---|---|---|
| Ex. 1 | n-butylchloride | 0.065 | 0.70 | 0.35 | 2.04 |
| Ex. 2 | n-butylchloride | 0.216 | 2.34 | 1.17 | 2.10 |
| Ex. 3 | n-hexylchloride | 0.065 | 0.54 | 0.27 | 1.85 |
| Comp. 1 | — | — | — | — | 1.67 |
| Ex. 4 | sec.-butylchloride | 0.063 | 0.68 | 0.34 | 2.76 |
| Ex. 5 | tert.-butylchloride | 0.063 | 0.68 | 0.34 | 2.10 |
| Comp. 2 | — | — | — | — | 1.79 |
| Ex. 6 | n-butylchloride | 0.065 | 0.70 | 0.35 | 2.13 |
| Ex. 7 | sec.-butylchloride | 0.053 | 0.57 | 0.29 | 2.05 |
| Ex. 8 | sec.-butylchloride | 0.132 | 1.43 | 0.71 | 2.42 |
| Ex. 9 | sec.-butylchloride | 0.198 | 2.14 | 1.07 | 2.57 |
| Ex. 10 | sec.-butylchloride | 0.396 | 4.28 | 2.14 | 2.68 |
| Ex. 11 | tert.-butylchloride | 0.396 | 4.28 | 2.14 | 2.09 |
| Comp. 3 | — | — | — | — | 1.53 |

TABLE 2

| Example | Comp. C | mass C [g] | Σmol C [mol] | Ratio C/Ti [mol/mol] | Maturity [days] | Spec. Mileage [kgPE/(gcat * barC2 * h)] |
|---|---|---|---|---|---|---|
| Ex. 12 | sec.-butylchloride | 139 | 1.5 | 1.4 | 4 | 1.62 |
| Ex. 13 | sec.-butylchloride | 127 | 4.3 | 4.4 | 4 | 1.68 |
| Ex. 14 | sec.-butylchloride | 121 | 5.6 | 5.5 | 5 | 2.23 |
|  |  |  |  |  | 12 | 2.08 |
| Ex. 15 | sec.-butylchloride | 115 | 6.9 | 7.7 | 6 | 2.73 |
|  |  |  |  |  | 28 | 2.59 |
| Ex. 16 | sec.-butylchloride | 109 | 8.0 | 9.7 | 6 | 2.81 |
|  |  |  |  |  | 28 | 3.04 |
| Comp. 4 | — | — | — | — | — | 1.51 |

The invention claimed is:

1. A process which comprises polymerizing an olefin in the presence of a catalyst system obtained by contacting (A) a catalyst component obtained by reacting a $Mg(OR_1)(OR_2)$ compound, in which $R_1$ and $R_2$ are identical or different and are each a $C_1$-$C_{10}$ alkyl radical and a tetravalent transition metal compound having at least a metal-halogen bond, used in amounts such that the molar ratio of metal/Mg is from 0.05 to 10; (B) an aluminum alkyl compound; and (C) a linear or branched halogenated alkyl compound which is used in such an amount to give a (C) metal ratio ranging from 0.1 to 5 wherein the contact between (A) and (C) takes place at the end of the preparation of (A).

2. The process of claim 1 wherein compound (C) has from 1 to 10 carbon atoms.

3. The process of claim 1 wherein in compound (C), the halogen is chlorine.

4. The process of claim 1 wherein compound (C) has from 2 to 6 carbon atoms.

5. The process of claim 4 wherein compound (C) is ethyl chloride or sec-butyl chloride.

6. The process of claim 1 wherein compound (B) is a trialkylaluminum compound.

7. The process of claim 1 wherein $R_1$ and $R_2$ are $C_2$-$C_{10}$ alkyl groups.

8. The process of claim 7 wherein the $Mg(OR_1)(OR_2)$ compound is magnesium ethylate.

9. The process of claim 1 wherein the tetravalent transition metal compound is $TiCl_4$.

10. The process of claim 1 wherein the particle size of component (A) ranges from 5 to 30 μm.

11. The process of claim 1 comprising polymerizing ethylene in the liquid phase.

12. The process of claim 1 wherein the (C)/metal ratio ranges from 0.2 to 4.

13. The process of claim 1 wherein the ratio of metal/Mg is from 0.2 to 4.

14. The process of claim 12 wherein the ratio of metal/Mg is from 0.2 to 4.

15. A process which comprises polymerizing an olefin in the presence of a catalyst system obtained by contacting (A) a catalyst component obtained by reacting a $Mg(OR_1)(OR_2)$ compound, in which $R_1$ and $R_2$ are identical or different and are each a $C_1$-$C_{10}$ alkyl radical and a tetravalent transition metal compound having at least a metal-halogen bond, used in amounts such that the molar ratio of metal/Mg is from 0.05 to 10; (B) an aluminum alkyl compound; and (C) a linear or branched halogenated alkyl compound which is used in such an amount to give a (C)metal ratio ranging from 0.1 to 5 wherein the contact between (A) and (C) takes place at the end of the preparation of (A), and wherein in compound (C), the halogen is linked to a secondary carbon atom.

* * * * *